(12) United States Patent
Yano et al.

(10) Patent No.: US 11,830,251 B2
(45) Date of Patent: Nov. 28, 2023

(54) VIDEO MONITORING APPARATUS, METHOD OF CONTROLLING THE SAME, COMPUTER-READABLE STORAGE MEDIUM, AND VIDEO MONITORING SYSTEM

(71) Applicant: CANON KABUSHIKI KAISHA, Tokyo (JP)

(72) Inventors: Kotaro Yano, Tokyo (JP); Tomoaki Kawai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/326,418

(22) Filed: May 21, 2021

(65) Prior Publication Data
US 2021/0271896 A1  Sep. 2, 2021

Related U.S. Application Data

(63) Continuation of application No. 15/856,577, filed on Dec. 28, 2017, now Pat. No. 11,048,947.

(30) Foreign Application Priority Data

Jan. 13, 2017 (JP) .................................. 2017-004617

(51) Int. Cl.
*G06K 9/62* (2022.01)
*G06V 20/52* (2022.01)
(Continued)

(52) U.S. Cl.
CPC .......... *G06V 20/52* (2022.01); *A47G 9/1027* (2013.01); *G06N 3/045* (2023.01); *G06N 3/08* (2013.01); *H04N 7/181* (2013.01)

(58) Field of Classification Search
CPC combination set(s) only.
See application file for complete search history.

(56) References Cited

U.S. PATENT DOCUMENTS 6,141,437 A     10/2000   Xu
11,048,947 B2 *  6/2021   Yano ..................... G06V 20/52
(Continued)

FOREIGN PATENT DOCUMENTS

CN    101061713 A    10/2007
CN    101069424 A    11/2007
(Continued)

OTHER PUBLICATIONS

Notice of Allowance issued in U.S. Appl. No. 15/856,577 dated Jul. 31, 2019.
(Continued)

*Primary Examiner* — Samir A Ahmed
(74) *Attorney, Agent, or Firm* — ROSSI, KIMMS & McDOWELL LLP

(57) ABSTRACT

According to the present invention, switching of the monitoring images matching the intention of the observer can be automatically performed for images from a plurality of image capturing apparatus, and the load about the job of the observer can be reduced. The image monitoring apparatus includes an estimating unit configured to estimate attention degrees of a user for a plurality of images acquired from the plurality of image capturing apparatuses, a designating unit configured to designate one of the acquired images as an image to be displayed in accordance with an instruction from the user, a learning unit configured to cause the estimating unit to learn so as to increase an attention degree of the designated image, and a selecting unit configured to select one of the plurality of images based on an attention degree of each estimated image.

13 Claims, 5 Drawing Sheets

(51) Int. Cl.
*H04N 7/18* (2006.01)
*G06N 3/08* (2023.01)
*A47G 9/10* (2006.01)
*G06N 3/045* (2023.01)

(56) References Cited

U.S. PATENT DOCUMENTS

| | | |
|---|---|---|
| 2010/0177963 A1 | 7/2010 | Yokomitsu |
| 2011/0128374 A1* | 6/2011 | Shellshear ............... H04N 7/18 348/135 |
| 2011/0161278 A1 | 6/2011 | Kawagishi |
| 2011/0267499 A1 | 11/2011 | Wan |
| 2012/0155718 A1 | 6/2012 | Hwang |
| 2013/0195364 A1 | 8/2013 | Yokomitsu |
| 2014/0112546 A1 | 4/2014 | Lee |
| 2014/0221090 A1* | 8/2014 | Mutschler ............. A63F 13/211 463/31 |
| 2014/0240486 A1* | 8/2014 | Okada ................ G01N 21/9501 348/87 |
| 2017/0078901 A1 | 3/2017 | Iwanaga |

FOREIGN PATENT DOCUMENTS

| | | |
|---|---|---|
| CN | 101751782 A | 6/2010 |
| CN | 104504362 A | 4/2015 |
| CN | 105163183 A | 12/2015 |
| CN | 105989174 A | 10/2016 |
| CN | 106303382 A | 1/2017 |
| JP | 2005136978 A | 5/2005 |
| JP | 2008288870 * | 11/2008 |
| JP | 2008288870 A | 11/2008 |
| JP | 2016081355 A | 5/2016 |

OTHER PUBLICATIONS

Notice of Allowance issued in U.S. Appl. No. 15/856,577 dated Nov. 29, 2019.
Office Action issued in U.S. Appl. No. 15/856,577 dated Mar. 2, 2020.
Office Action issued in Chinese Appln. No. 201810020855.9 dated Mar. 3, 2020. English translation provided.
Office Action issued in U.S. Appl. No. 15/856,577 dated Sep. 21, 2020.
Notice of Allowance issued in U.S. Appl. No. 15/856,577 dated Feb. 24, 2021.

* cited by examiner

F1  F2···

VIDEO MONITORING APPARATUS, METHOD OF CONTROLLING THE SAME, COMPUTER-READABLE STORAGE MEDIUM, AND VIDEO MONITORING SYSTEM

BACKGROUND OF THE INVENTION

Field of the Invention

The present invention relates to a video monitoring apparatus, a method of controlling the same, a computer-readable storage medium and a video monitoring system.

Description of the Related Art

In recent years, the number of installed monitoring cameras is increasing, and the importance of use of a monitoring system is increasing. In offices and large-scale commercial facilities, monitoring cameras are installed to manage building facilities, and these monitoring cameras are systematically managed by an emergency control center. In addition, detection of suspicious persons and monitoring of degrees of congestion are also expected. Even in event venues where sports competitions and concerts are held, and their surrounding urban areas, utilization of these functions is also proposed. In addition, there is a demand to able to detect abnormalities such as quarrels and falling accidents.

However, the increase in the number of installed cameras indicates the increase in the number of videos as confirmation targets, and it is more difficult to confirm all the videos. In a general monitoring system, an observer switches videos every predetermined time interval. However, such a switching method may fail to monitor important camera videos.

In order to cope with this, the same assignee as the present application proposed Japanese Patent Laid-Open No. 2016-81355 (to be referred to as literature 1 hereinafter) in which a feature amount is calculated from a monitoring video and an abnormality is automatically detected based on the calculated feature amount. Automatic switching of the monitoring videos based on the abnormality detection result can reduce the job load of the observer.

On the other hand, Japanese Patent Laid-Open No. 2008-288870 (to be referred to as literature 2 hereinafter) proposes a method of learning the abnormality degree of monitoring videos from the line of sight of an observer and an operation history to quickly find an abnormal event, thereby reducing the job load of the observer.

According to literature 1, an abnormality is detected from an observation model learned based on normal and abnormal labels labelled in advance. For this reason, a detection result matching the intention of the observer cannot necessarily be obtained. The observer will miss an abnormality to be confirmed.

According to literature 2, abnormalities reflecting the line of sight of the observer and the operation history are learned. However, since the abnormality degrees are accumulated in a database and searched for, it takes time to detect the abnormality degrees when the data amount increases. In particular, when a large number of cameras are to be monitored, the search processing time becomes long with an increase in the number of cameras.

SUMMARY OF THE INVENTION

The present invention has been made in consideration of the above problems and provides a technique for automatically switching monitoring images which match the intention of an observer for images from a plurality of image capturing apparatuses and reducing the load about the job of the observer.

According to a first aspect of the invention, there is provided a video monitoring apparatus comprising: an acquisition unit configured to acquire images from a plurality of image capturing apparatuses; an estimating unit configured to estimate attention degrees of a user for a plurality of images acquired from the plurality of image capturing apparatuses; a designating unit configured to designate one of the acquired images as an image to be displayed in accordance with an instruction from the user; a learning unit configured to cause the estimating unit to learn so as to increase an attention degree of the image designated by the designating unit; and a selecting unit configured to select one of the plurality of images based on an attention degree of each image estimated by the estimating unit.

According to a second aspect of the invention, there is provided a method of controlling a video monitoring apparatus, comprising: acquiring images from a plurality of image capturing apparatuses; estimating attention degrees of a user for a plurality of images acquired from the plurality of image capturing apparatuses; designating one of the acquired images as an image to be displayed in accordance with an instruction from the user; causing an estimating unit to learn so as to increase an attention degree of the image designated in the estimating; and selecting one of the plurality of images based on an attention degree of each image estimated in the estimating.

According to a third aspect of the invention, there is provided a non-transitory computer-readable storage medium storing a program which, when executed by a computer, causes the computer to execute steps of a method of controlling a video monitoring apparatus, the method comprising: acquiring images from a plurality of image capturing apparatuses; estimating attention degrees of a user for a plurality of images acquired from the plurality of image capturing apparatuses; designating one of the acquired images as an image to be displayed in accordance with an instruction from the user; causing an estimating unit to learn so as to increase an attention degree of the image designated in the estimating; and selecting one of the plurality of images based on an attention degree of each image estimated in the estimating.

According to a fourth aspect of the invention, there is provided a video monitoring system comprising: a plurality of image capturing apparatuses; and a video monitoring apparatus communicably connected to the plurality of image capturing apparatuses and configured to display images captured by the plurality of image capturing apparatuses, wherein the image monitoring apparatus comprises: an estimating unit configured to estimate attention degrees of a user for a plurality of images acquired from the plurality of image capturing apparatuses; a designating unit configured to designate one of the acquired images as an image to be displayed in accordance with an instruction from the user; a learning unit configured to cause the estimating unit to learn so as to increase an attention degree of the image designated by the designating unit; and a selecting unit configured to select one of the plurality of images based on an attention degree of each image estimated by the estimating unit.

According to the present invention, switching of the monitoring images matching the intention of the observer can be automatically performed for images from a plurality of image capturing apparatuses, and the load about the job of the observer can be reduced.

Further features of the present invention will become apparent from the following description of exemplary embodiments (with reference to the attached drawings).

DESCRIPTION OF THE EMBODIMENTS

An embodiment according to the present invention will be described with reference to the accompanying drawings.

Figure 1:
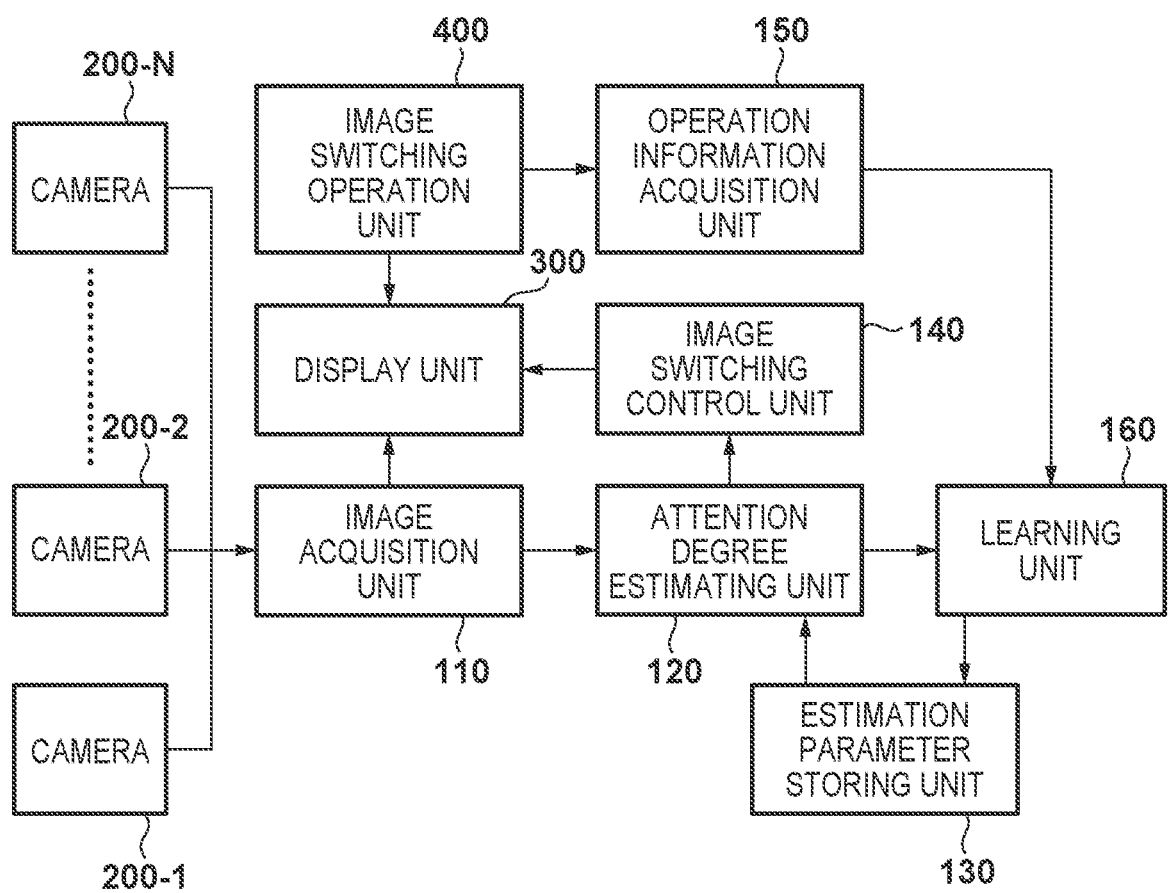
FIG. 1 is a block diagram showing the functional arrangement of a video monitoring system according to an embodiment.

FIG. 1 is a block diagram showing the functional arrangement of a video monitoring system according to an embodiment. The video monitoring system includes a plurality of cameras 200-1 to 200-N (N≥2), a display unit 300, a screen switching operation unit 400, an image acquisition unit 110, an attention degree estimating unit 120, an estimation parameter storing unit 130, a screen switching control unit 140, an operation information acquisition unit 150, and a learning unit 160. The cameras 200-1 to 200-N can communicate with the image acquisition unit 110 by wired or wireless communication.

The display unit 300 is made from a liquid crystal panel, an external monitor, or the like and outputs images captured by the cameras and various kinds of information. The screen switching operation unit 400 is made from a mouse, a keyboard, a touch panel device, and buttons and inputs a screen switching operation of videos captured by the plurality of cameras. Units 110 to 160 are implemented by an arithmetic processing apparatus made from a CPU (Central Processing Unit), a GPU (Graphics Processing unit), and memories. These components execute operation programs to be described later to implement the present invention. The respective processing units are communicable with each other and are connected via a bus or the like.

The image acquisition unit 110 acquires image data captured by the cameras 200-1 to 200-N. The image data is a still image or time-series image data. When the cameras 200-1 to 200-N are installed on the network, the correspondence between each image and each camera can be specified from the name or address (for example, an IP address) of each camera on the network. In this embodiment, information representing correspondence between each image and each camera is represented by a camera identification number.

The display unit 300 displays an image acquired by the image acquisition unit 110. The attention degree estimating unit 120 estimates an index value (to be referred to as an attention degree hereinafter) representing an attention degree of a user (observer) for each image acquired by the image acquisition unit 110 using the parameter stored in the estimation parameter storing unit 130. As a matter of course, a screen (image) selected by a screen switching operation of a user is higher attention degree than that of an unselected image.

The screen switching control unit 140 automatically switches screens displayed on the display unit 300 in accordance with the attention degrees of the images of the plurality of cameras which are estimated by the attention degree estimating unit 120. The observer can manually cause the screen switching operation unit 400 to switch the screens displayed on the display unit 300. Switching by the screen switching operation unit 400 has a higher priority over the operation in the screen switching control unit 140. The operation information acquisition unit 150 acquires operation information of the screen switching operation unit 400. The learning unit 160 learns a parameter from the attention degrees of the plurality of cameras estimated by the attention degree estimating unit 120 and the operation information acquired by the operation information acquisition unit 150 and stores the learned parameter in the estimation parameter storing unit 130.

Figure 2:
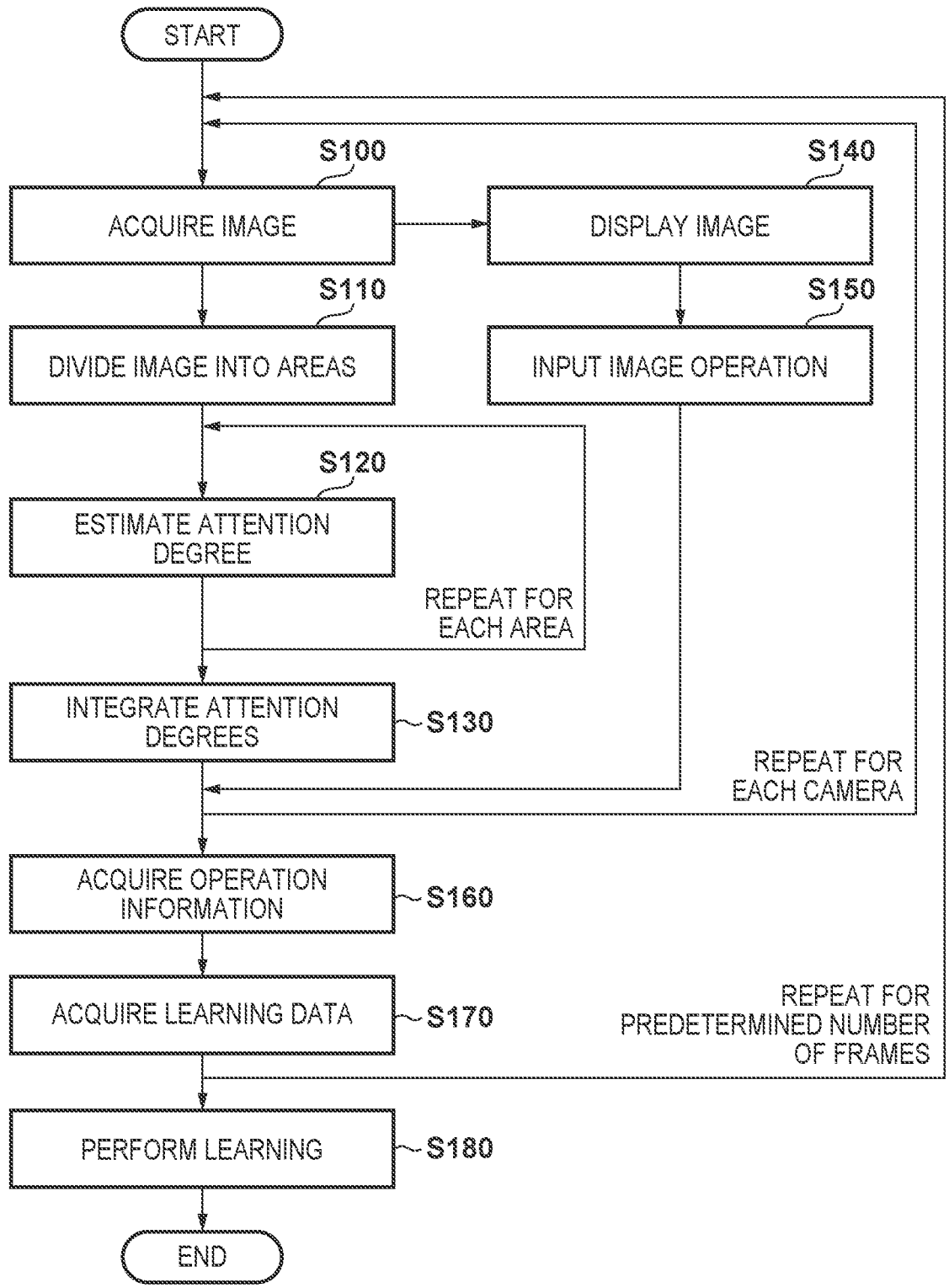
FIG. 2 is a flowchart showing the processing sequence of the video monitoring system according to the embodiment at the time of learning.

The operation of the video monitoring system according to the embodiment at the time of learning (learning stage) will be described with reference to the processing sequence shown in FIG. 2.

The image acquisition unit 110 acquires image data captured by the cameras 200-1 to 200-N (step S100). The image data to be acquired is two-dimensional data made of R, G, and B 8-bit pixels which can be acquired sequentially in time series. The acquired image data is held in a memory (not shown).

Figure 3:
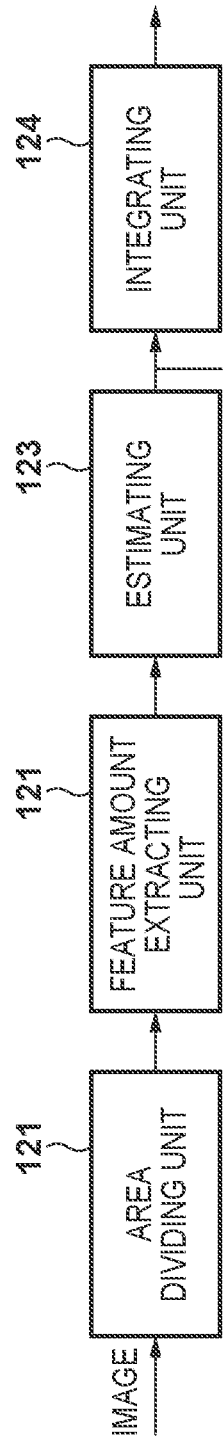
FIG. 3 is a block diagram showing the arrangement of an attention degree estimating unit of the video monitoring system according to the embodiment.

The attention degree estimating unit 120 estimates the attention degree of each image acquired by the image acquisition unit 110 using the parameter stored in the estimation parameter storing unit 130. The arrangement of the attention degree estimating unit 120 is shown in FIG. 3. As shown in FIG. 3, the attention degree estimating unit 120 includes an area dividing unit 121, a feature amount extracting unit 122, an estimating unit 123, and an integrating unit 124. The area dividing unit 121 divides attention image data acquired by the image acquisition unit 110 by predetermined numbers in the horizontal and vertical directions, thereby generating a plurality of image areas having the same size (step S110). The area dividing unit 121 normalizes each divided image area to a predetermined size. In this embodiment, the image divided into areas having the same size (H pixels in the vertical direction and W pixels in the horizontal direction) is normalized. However, the normalization method is not limited to this. For example, an area close to the center of the screen may be set smaller than other areas. In addition, areas to be divided may partially overlap each other. The areas may have different sizes.

The feature amount extracting unit 122 and the estimating unit 123 estimate the attention degree of each of the image areas divided by the area dividing unit 121 (step S120). The feature amount extracting unit 122 and the estimating unit 123 are made from a deep neural network shown in FIG. 4. In this neural network, an RGB image of a local area having a resolution H×W is input, and the arithmetic operation of a 5-layer convolution neural network is performed. The arithmetic operation result is obtained via an all coupled neural network of the sixth and seventh layers. Reference symbols f1 to f5 denote filter sizes of the convolution operations of the first to fifth layers. Reference symbols d1 to d7 denote output channel counts of the first to seventh layers. The feature amount extracting unit 122 is made from a convolution neural network of the first to fifth layers and obtains an image feature amount. This image feature amount is supplied to the estimating unit 123. The estimating unit 123 is made from the all coupled neural network of the sixth and seventh layers and outputs an attention degree. The attention degree is a value representing a degree by which the observer pays attention to the monitoring video.

The attention degree estimating unit 120 repeats the above estimation processing by the number of areas divided by the area dividing unit 121. The integrating unit 124 of the attention degree estimating unit 120 integrates the outputs from the estimating unit 123 of the attention degree estimating unit 120 (step S130). The integrating unit 124 according to this embodiment compares the attention degrees estimated for the plurality of areas and obtains the highest attention degree. Note that in addition to this, the attention degrees estimated from the plurality of areas may be averaged or another integration method may be used.

Figure 5:
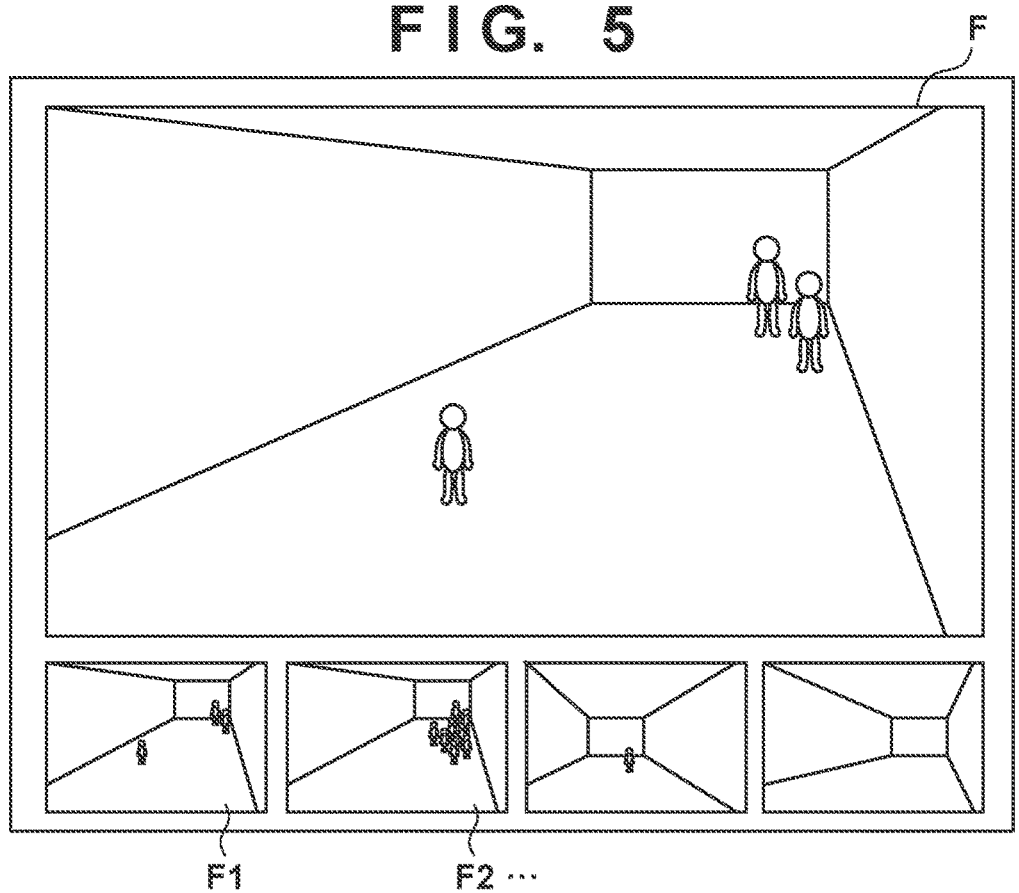
FIG. 5 is a view showing an example of a display screen of the video monitoring system according to the embodiment.

The display unit 300 displays an image acquired by the image acquisition unit 110 (step S140). An example of a screen displayed on the display unit 300 is shown in FIG. 5. Reference symbol F denotes a main screen (a screen to which the user particularly pays attention). Reference symbols F1, F2, ... denote subscreens from the cameras 200-1, 200-2, .... In this example, the image of the camera 200-1 is displayed on the main screen F. Note that the four subscreens are displayed in FIG. 5, but four subscreens out of the five subscreens may be displayed by performing scrolling in the horizontal direction. That is, the number of subscreens may be arbitrarily set.

Figure 6:
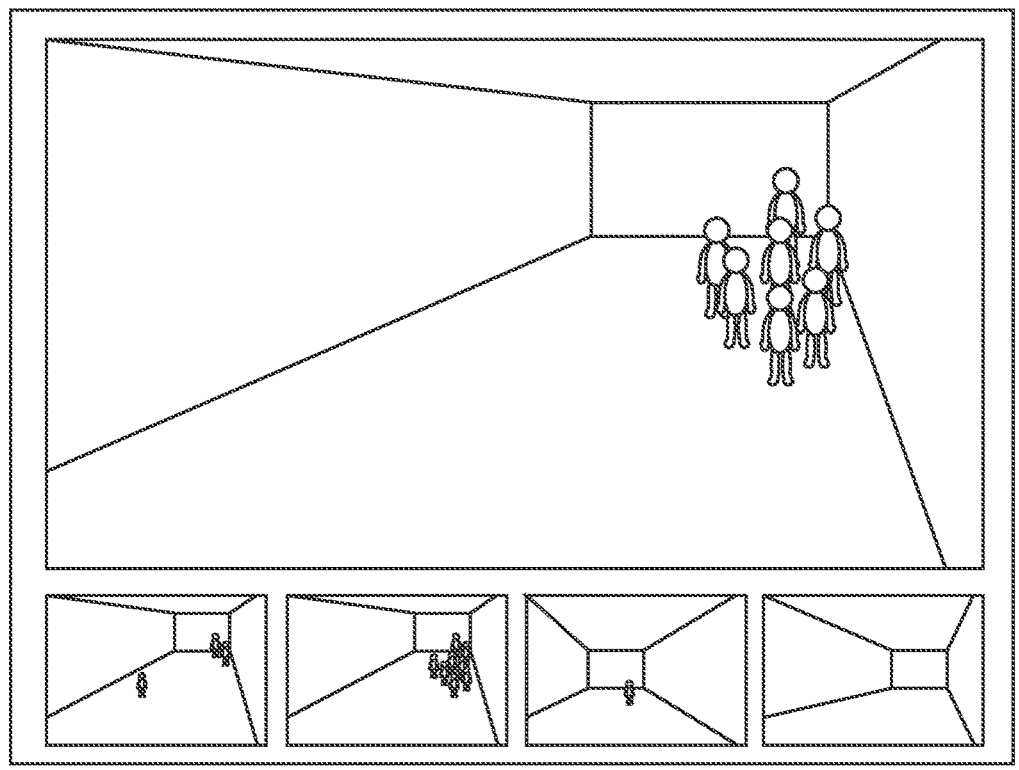
FIG. 6 is a view showing a display screen after a screen switching operation of the video monitoring system according to the embodiment.

The screen switching operation unit 400 accepts a screen switching operation from a user who monitors the screen displayed on the display unit 300 and switches the screens to be displayed on the display unit 300 (step S150). An example of the screen after the screen switching operation is shown in FIG. 6. FIG. 6 shows an example in which the user switches the main screen from the video of the camera 200-1 to the video from the camera 200-2. FIG. 6 shows an example in which the user observes that the persons get together, and switches the screen of the camera 200. Note that this switching operation is performed when the user designates one subscreen from the pointing device, the keyboard, or the like. The processing from step S100 to step S150 is repeated by a predetermined number of times.

The operation information acquisition unit 150 acquires operation information of the screen switching operation unit 400 (step S160). The operation information to be acquired here is a camera identification number for specifying the camera of the selected image. The learning unit 160 acquires, as learning data, the attention degrees of the images obtained by the plurality of cameras and estimated by the attention degree estimating unit 120 and the camera identification number acquired by the operation information acquisition unit 150 (step S170). When the user does not select one image, the process returns to step S100 for the next image acquisition.

On the other hand, when the user selects one image, the process advances to step S180. In step S180, the learning unit 160 updates the parameter used in the attention degree estimating unit 120 by using the acquired learning data and stores the updated parameter in the estimation parameter storing unit 130.

The above processing is repeated until the number of times the images are acquired from each camera reaches a predetermined value.

The stochastic gradient descent method for obtaining an estimation parameter from the average loss gradient is used for learning of the neural network. Let $A^p$ be an attention degree after integration obtained in step S130 for an image obtained from a camera corresponding to the camera identification number, out of the attention degrees estimated by the attention degree estimating unit 120; and let $A^m_i$ be an attention degree after integration obtained in step S130 for an image obtained from another camera. Note that i indicates a value representing the data index. In this embodiment, a difference between the attention degree of a camera selected by the user and the attention degree of a camera not selected by the user is evaluated as an average loss. The loss function can be obtained by:

$$L=\Sigma I(A^P-A^m_i<0) \quad (1)$$

where I( ) is the indicator function. This function outputs 1 if the value in the parentheses is true; and otherwise 0. $\Sigma$ represents the total sum of the number of learning data of the index i. All data may be used for learning, or a predetermined number of data may be selected at random.

Figure 4:
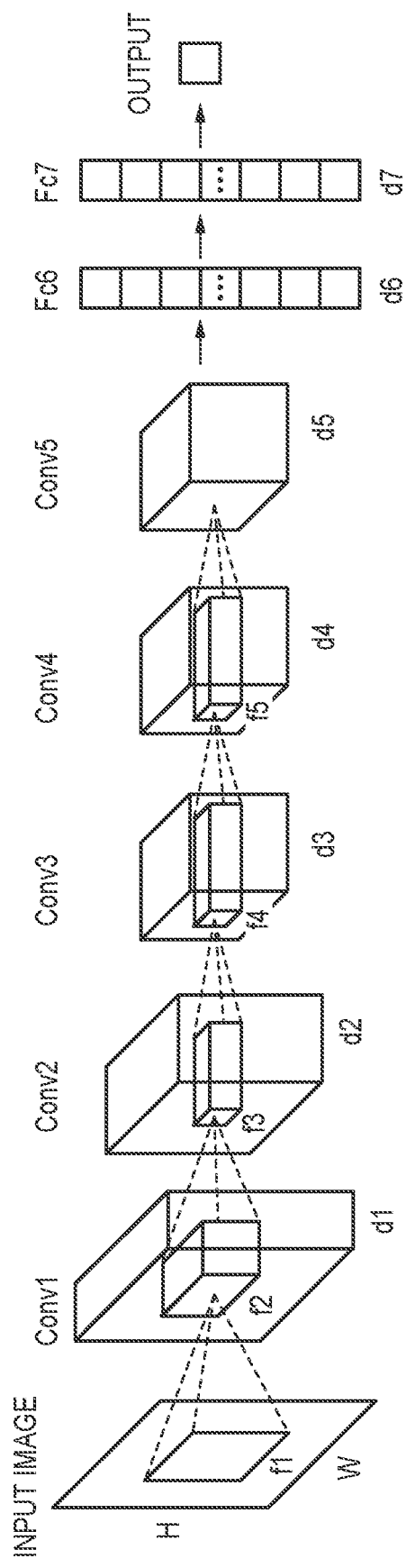
FIG. 4 is a view showing a neural network to estimate the attention degree of the video monitoring system according to the embodiment.

The learning unit 160 obtains a gradient based on equation (1) from the estimating unit 123 of the attention degree estimating unit 120, that is, from an attention degree estimation value obtained by changing the parameter of each of the sixth and seventh layers of the neural network shown in FIG. 4 by a predetermined small value. The learning unit 160 allows the estimation parameter to learn so as to reduce the average loss. That is, learning is performed by updating the estimation parameter so as to increase the difference between the attention degree of the selected image and the attention degree of the unselected image. The learning unit 160 stores the obtained parameter in the estimation parameter storing unit 130, thereby updating the estimation parameter.

Processing on the learning stage according to this embodiment has been described above. In the above description, the learning stage processing is triggered when the number of times of acquisition of the images from each camera reaches a predetermined number of times. However, when the numbers of times the image acquisition is performed and the user performs image selection operation are large, a higher learning effect can be expected. When the numbers of times the image acquisition is performed and the user performs image selection operation reach predetermined counts, these numbers of times can be given as a condition.

Figure 7:
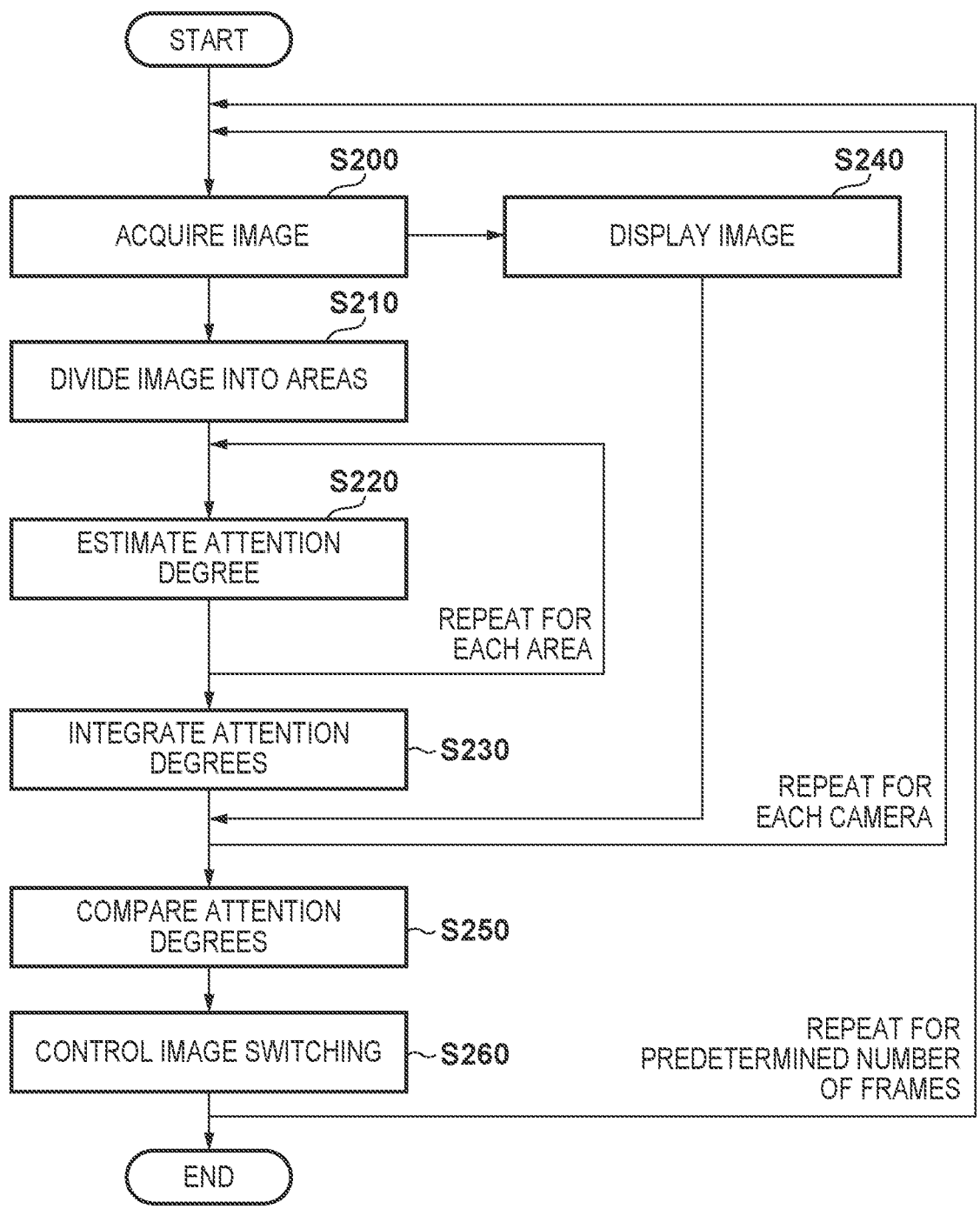
FIG. 7 is a flowchart showing the processing sequence of the video monitoring system according to the embodiment at the time of automatic control.

The operation of the display control of the video monitoring system according to this embodiment at the time of automatic screen switching control (operation stage) will now be described with reference to the processing sequence shown in FIG. 7.

The image acquisition unit 110 acquires image data captured by the cameras 200-1 to 200-N (step S200). The area dividing unit 121 of the attention degree estimating unit 120 divides each image data obtained by the image acquisition unit 110 by predetermined numbers in the vertical and horizontal directions, thereby obtaining image areas having the same size. The image acquisition unit 110 normalizes the divided image areas into a predetermined size set in advance (step S210).

The feature amount extracting unit 122 and the estimating unit 123 of the attention degree estimating unit 120 estimate the attention degree for each of the areas divided by the area dividing unit 121 (step S220). At this time, when the estimation parameter is updated in the learning processing described above, the attention degree is estimated using the latest parameter. In addition, the attention degree estimating unit 120 repeats the estimation processing by the number of areas divided by the area dividing unit 121.

The integrating unit 124 of the attention degree estimating unit 120 integrates outputs from the estimating unit 123 of the attention degree estimating unit 120 (step S230).

On the other hand, the display unit 300 displays the image acquired by the image acquisition unit 110 on a subscreen (step S240). Processing from step S200 to step S240 is repeated for the cameras 200-1 to 200-N by the number of cameras.

The screen switching control unit 140 compares the integrated attention degrees obtained in step S230 for the image of each camera and obtains a camera identification number of a camera which has captured an image having the largest attention degree (step S250).

The screen switching control unit 140 displays the obtained camera identification number image on the main screen of the display unit 300, thereby automatically switching the screens (step S260).

The operation at the time of automatic control is thus complete. Note that processing continues until an automatic control end instruction is input via an operation unit (not shown).

As has been described above, according to this embodiment, by using an operation of switching the screens using the attention degree estimated from the image for each camera, learning is performed such that the attention degree of the camera selected by the user becomes larger than the attention degree of another camera. For this reason, learning of switching screens matching the intension of the user can be performed. Since the learned parameter can be updated, the processing time does not pose any problem even if the number of cameras is increased.

Note that in this embodiment, the attention degree estimating unit is formed from a neural network. However, it is possible to form the attention degree estimating unit using an estimating unit using another machine learning such as a support vector machine.

The attention degree estimating unit according to this embodiment estimates the attention degree from a still image, but can estimate the attention degree from a time-space image (moving image) obtained by coupling the areas of a plurality of frames of a time-series image.

For example, if a camera captures a moving image by 30 frames/sec, a neural network which receives 30 (for 1 sec) feature amounts arranged on the latest time axis or the attention degrees shown in the above embodiment is used. Learning is performed such that the time axis video from the camera selected (given attention) by the user is distinguished from the time axis video from an unselected camera.

In the above embodiment, the learning unit acquires, as learning data for each area, the plurality of estimation results in the image which are estimated by the attention degree estimating unit. However, the estimation results may be integrated as one estimation result by the integrating unit of the attention degree estimating unit, and then the integrated estimation result can be set as the learning data for each camera image. Alternatively, the plurality of estimation results of the attention degree estimating unit may be integrated and estimated using a recursive neural network, and the learning unit receives the output from this neural network as the learning data. An RNN (Recurrent Neural Network) or an LSTM (Long Short-Term Memory) may be used as the recursive neural network.

In this embodiment, the learning unit performs learning such that the attention degree of the camera selected by the screen switching operation unit is larger than the attention degree of another camera. However, pieces of information before and after the screen switching operation may be used. For example, learning may be performed such that the attention degree of the selected camera is set larger than the attention degree of the camera which is displayed on the main screen before selection.

The learning stage and the screen switching stage (operation stage) may be automatically switched based on the time when the user performs the screen switching operation.

In the above embodiment, the images are acquired from the cameras 200-1 to 200-N on the learning stage. For example, the images captured in the past (immediately preceding day) by the cameras 200-1 to 200-N are stored in a storage device such as a hard disk in association with the camera identification numbers. As for the acquisition of an image from each camera from the storage device, learning may be performed such that the user repeats the selection operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-004617, filed Jan. 13, 2017, which is hereby incorporated by reference herein in its entirety.

What is claimed is:
1. A video monitoring apparatus comprising:
a neural network to be trained;
one or more memories storing instructions; and one or more processors configured to execute the instructions to;
acquire a plurality of images;
acquire information for specifying one of the plurality of the images to be displayed in accordance with an instruction from a user;
train the neural network by updating an estimated parameter of a degree of attention of a user so that the degree of attention of a user to an image specified by the information becomes higher than that of an image not specified, based on a loss function for evaluating a difference between the degree of attention for the image specified by the information and the degree of attention for the image not specified,
wherein the trained neural network estimates a degree of attention for each of the plurality of acquired images, and
the one or more processors select, based on the estimated degree of attention for each acquired image, an image whose degree of attention is larger than that of other images among the plurality of acquired images.

2. The apparatus according to claim 1, wherein the neural network is trained until the user inputs a predetermined instruction.

3. The apparatus according to claim 1, wherein the neural network is trained based on time of an image selection operation by the user.

4. The apparatus according to claim 1, wherein each of the plurality of acquired images is divided into a plurality of divided areas,
the estimating of degree of attention includes integrating respective divided areas, and
the degrees of attention for the areas are integrated to a highest degree of attention for the areas.

5. The apparatus according to claim 1, wherein each of the plurality of acquired images is divided into a plurality of divided areas,
the estimating of degree of attention includes integrating respective divided areas, and
the degrees of attention for the areas are integrated to an average of the degrees of attention for the areas.

6. The apparatus according to claim 1, wherein the degree of attention estimated for an image and an identifier of the video monitoring camera that captured the image are included in learning data for the neural network.

7. The apparatus according to claim 1, wherein the neural network is updated when an instruction is executed in response to the acquisition of a predetermined times.

8. The apparatus according to claim 1, wherein the degree of attention is estimated from a time-space image obtained by coupling a plurality of image frames.

9. The apparatus according to claim 1, wherein the one of the plurality of images to be displayed is displayed in a main screen with displaying, at least another of the plurality of images to be displayed other than the one image displayed in the main screen, in sub screens.

10. The apparatus according to claim 1, wherein the plurality of acquired images are acquired from a plurality of image capturing apparatuses.

11. The apparatus according to claim 1, wherein the plurality of acquired images are acquired from a storage device storing a plurality of images captured previously.

12. A method of controlling, by one or more memories storing instructions and one or more processors configured to execute the instructions, a video monitoring system, including a neural network to be trained, the method comprising:
acquiring a plurality of images;
acquiring information for specifying one of the plurality of the images to be displayed;
training the neural network by updating an estimated parameter of a degree of attention of a user so that the degree of attention of a user to an image specified by the information becomes higher than that of an image not specified, based on a loss function for evaluating a difference between the degree of attention for the image specified by the information and the degree of attention for the image not specified,
wherein the trained neural network estimates a degree of attention for each of the plurality of acquired images, and
selecting, by the one or more processors, based on the estimated degree of attention for each acquired image, an image whose degree of attention is larger than that of other images among the plurality of acquired images.

13. A non-transitory computer-readable storage medium storing a program which, when executed by a computer, causes the computer to execute steps of a method of controlling a video monitoring system, including a neural network to be trained, the method comprising:
acquiring a plurality of images;
acquiring information for specifying one of the plurality of the images to be displayed;
training the neural network by updating an estimated parameter of a degree of attention of a user so that the degree of attention of a user to an image specified by the information becomes higher than that of an image not specified, based on a loss function for evaluating a difference between the degree of attention for the image specified by the information and the degree of attention for the image not specified,
wherein the trained neural network estimates a degree of attention for each of the plurality of acquired images, and
selecting, by the computer, based on the estimated degree of attention for each acquired image, an image whose degree of attention is larger than that of other images among the plurality of acquired images.

* * * * *